3,343,897
DEHYDRATING DEVICE

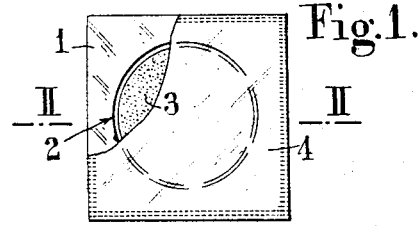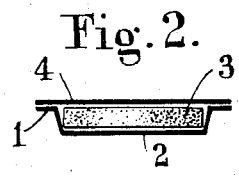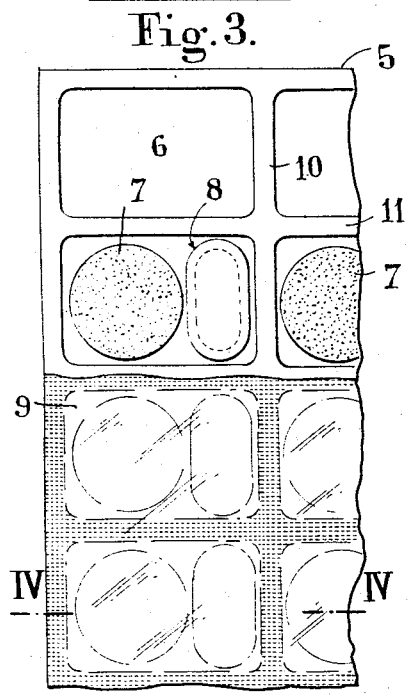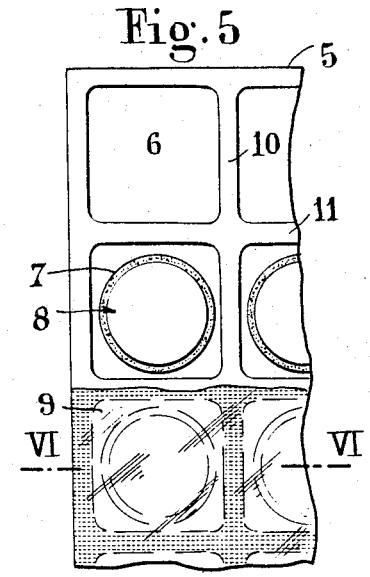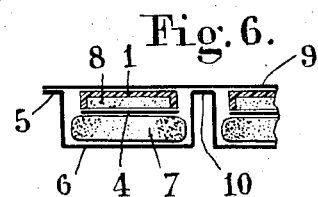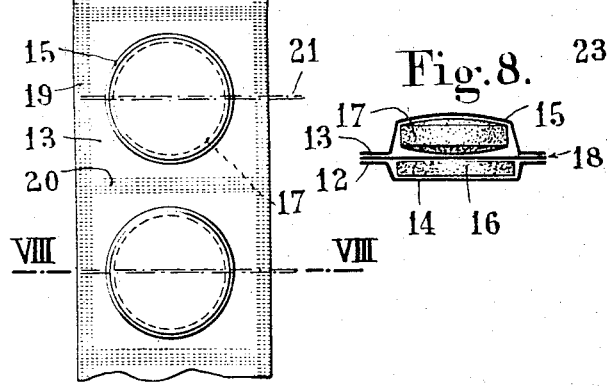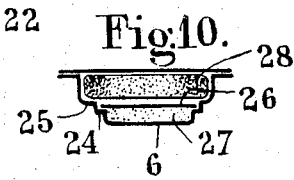

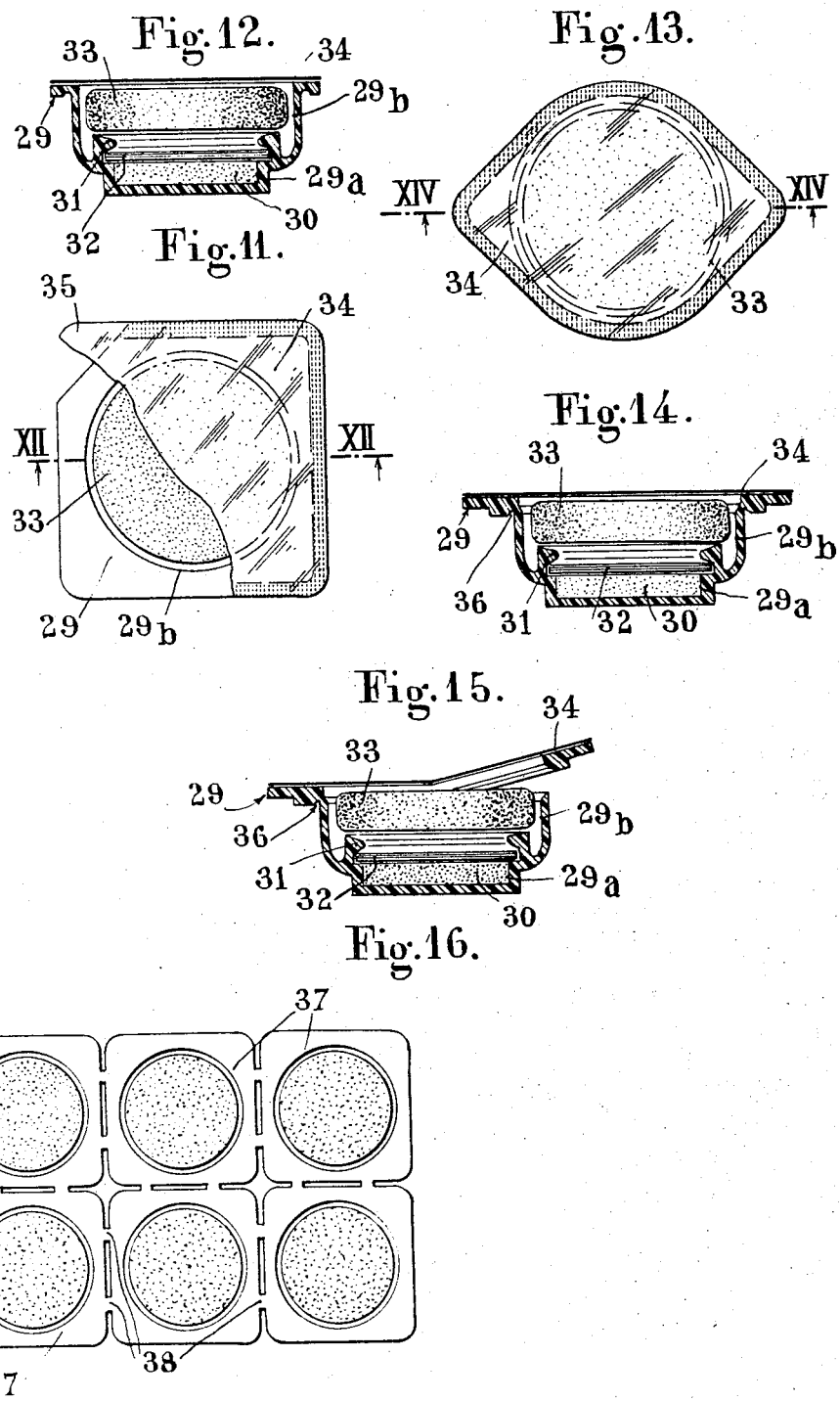

Pierre Walther Keller, Tangier, Morocco, assignor to Participations et Procedes Industriels S.A.H., Luxembourg, Luxembourg
Filed Mar. 23, 1965, Ser. No. 441,985
Claims priority, application France, Mar. 26, 1964, 968,817, Patent 1,398,105; addition, May 27, 1964, 976,006
1 Claim. (Cl. 312—31)

ABSTRACT OF THE DISCLOSURE

A dehydrating device consisting of a layer of impervious material having a cavity in its central portion, a dehydrating product disposed in the cavity, a layer of material pervious to water vapor covering the exposed face of the dehydrating product and sealed along its edges to the edges of the layer of impervious material.

---

This invention is concerned with dehydrating devices and has specific reference to a dehydrating device adapted to be easily manufactured on a commercial scale, which is both convenient to use and so arranged as to safely prevent any risk of being absorbed instead of the product, notably the pharmaceutical product which it is intended to preserve in an anhydrous condition.

This dehydrating device is specially designed for preserving in the anhydrous state medicinal products disposed between two layers of supporting bands of impervious material glued together throughout their length; however, many other applications may be contemplated for this device.

To this end, the dehydrating device according to the present invention is characterized in that it consists of a first layer of paper, fabric or other impervious material comprising in its central portion a cavity normally of circular configuration but having if desired any other suitable shape, in which the dehydrating product, for example in the form of a tablet, is laid, and of another layer of paper, fabric or any other material pervious to water vapor, which covers the free face of the dehydrating product and glued or welded along its edges to those of the first layer of impervious material.

It is obvious that these dehydrating devices may be manufactured continuously from bands or webs of any desired length consisting of the products forming said two layers of the dehydrating device and fed simultaneously to a machine adapted to form successive cavities in the band or web of impervious material, to fill these cavities with the dehydrating product, and subsequently glue or weld the pervious band on top of the impervious band at least along the edges of said cavities, whereafter the various dehydrating devices thus obtained may be detached by means of transverse cuttings to permit their subsequent use as separate devices.

If desired, these bands of dehydrating product may be used as such to constitute strips carrying at spaced intervals doses of medicinal products and notably tablets protected against the effects of humidity; to this end these bands of dehydrating devices are used as a second impervious layer in said bands of medicinal products, care being taken that the cavities formed in said impervious bands containing the medicinal product communicate with the cavities containing the dehydrating product through the thickness of the water vapor pervious bands.

A rib may be provided above the cavities intended for the dehydrating product, this rib being so formed that the piece of pervious paper or the like provided for isolating the dehydrating product from the medicinal product may penetrate beneath said rib and be locked automatically in this position.

Means may also be provided for facilitating the separation of the two layers of impervious material to enable the user to take the medicinal product therefrom.

To this end and according to a first form of embodiment of this invention, the two layers of impervious material are cut to different dimensions, so that one layer projects beyond the edges of the other to constitute a tab facilitating the gripping and separation of these layers; according to another form of embodiment of this invention at least one of said two layers comprises a portion having wholly or partly a reduced thickness which surrounds the cavity containing the medicinal product to constitute a tear line or line of incipient tear which permits of tearing off said layer and freeing said medicinal product.

Finally, another feature of this invention consists in providing the packing as described in the preceding paragraph from sheets formed with a predetermined number of cavities and therefore containing the same number of medicinal products, for example six or eight (or more or less according to needs), possibly adapted to be laid flat in a box or other suitable case, and formed with tear lines between the cavities containing the medicinal products to enable the user to easily separate the medicinal product which he or she wishes to take.

Reference will now be made to the accompanying drawings showing diagrammatically by way of example typical forms of embodiment of this invention. In the drawings:

FIGURE 1 is a plan view showing a dehydrating device;

FIGURE 2 is a section taken upon the line II—II of FIGURE 1;

FIGURE 3 is a plan view with parts broken away showing a typical application of the dehydrating devices of this invention;

FIGURE 4 is a section taken upon the line IV—IV of FIGURE 3;

FIGURES 5 and 6 are similar views showing another form of embodiment of these dehydrating devices;

FIGURES 7 and 8 are similar views showing a third form of embodiment of these devices;

FIGURES 9 and 10 are sectional views showing alternate forms of embodiment;

FIGURE 11 is a plan view with parts broken away;

FIGURE 12 is a cross-section taken upon the line XII—XII of FIGURE 11;

FIGURE 13 is a plan view showing an alternate form of embodiment;

FIGURE 14 is a sectional view taken along the line XIV—XIV of FIGURE 13;

FIGURE 15 is a similar view showing the practical use of this packing;

FIGURE 16 is a plan view showing a plurality of separable dehydrating devices having lugs.

The dehydrating device according to this invention which is illustrated in FIGURES 1 and 2 of the drawings comprises a first layer 2 of an impervious material which has formed in its central portion a cavity 2 in which a dehydrating product 3, for example in the form of a tablet, is laid, and another layer 4 of air-pervious material which is secured along its edges on the first layer 1. This dehydrating device may be used for manufacturing webs or sheets comprising medicinal products disposed at spaced intervals between two layers of an impervious material; in this case one of the layers of impervious material 5 comprises cavities 6 adapted to receive the medicinal product 7 and the dehydrating product 8, disposed either side by side, as shown in FIGURES 3 and 4, or above each other, as shown in FIGURES 5 and 6.

The web or sheet is completed or finished by simply gluing or welding in any suitable manner, on the first layer of impervious material 5, another layer of impervious material 9, these two layers being connected by gluing or welding around each cavity 8 along longitudinal and transverse lines 10 and 11 respectively. When it is desired to utilize the medicinal product, the webs or sheets are simply torn along their weld seams 10 and 11, whereafter the two layers of impervious material 5, 9 are separated and the medicinal product 7 is ready for use; there is no risk of confusion with the dehydrating device 8 enclosed between two layers of impervious material 1 and pervious material 4, respectively, thus precluding any risk of inadvertently absorbing the dehydrating material.

The manufacture of these webs of medicinal products may be further simplified, as well as the webs themselves, by forming them in the manner shown in FIGURES 7 and 8 of the drawings.

To this end, two layers of impervious material 12, 13 comprise each at spaced intervals cavities 14 or 17, one cavity being adapted to receive the dehydrating product 16 and the other the medicinal product 17; furthermore, a layer 18 of a material pervious to water vapor is interposed between the two layers 12 and 13 of impervious material and welded thereto both along its edges 19 and along its transverse lines 20 disposed between the different rows of successive cavities 14, 17.

If desired, there may be provided above each tablet of medicinal product 17, between this tablet and the layer of water vapor pervious material 18, a tab 21 projecting outside to facilitate the separation of the layer of impervious material 13 containing the medicinal product 17 in its cavity 15, thus permitting of easily gripping this product without any risk of taking dehydrating material 16 in lieu thereof.

To avoid any contact between the dehydrating product 16 and the medicinal product 17, which may occur in the forms of embodiment illustrated in FIGURES 6 and 8, the former may be modified as shown in FIGURES 9 and 10; a dehydrating tablet 22 may be laid in the bottom of the cavity 6 of the impervious layer 5 and isolated from the tablet constituting the medicinal product 7 by providing a constricted portion 23 providing an upper ledge on which the product 7 may rest; this arrangement is illustrated in FIGURE 9; in the modified form of embodiment shown in FIGURE 10 the edges of cavity 6 constitute two shoulders 24 and 25 receiving the first one the pervious paper or like material 26 covering the dehydrating product 27, and the other one the tablet 28.

The packing illustrated in FIGURES 11 to 16 consists of a cup 29 of plastic material or the like, formed with a cavity 29a receiving the medicinal product 30, a rib 31 of adequate configuration overlying this cavity, a piece of pervious paper or cardboard 32 locked beneath said rib 31, and another layer of impervious material 34 having its edges glued or welded in any suitable manner to those of the cup 29.

To facilitate the separation or removal of the other layer 34 when it is desired to take the medicinal product 33, one may form the flange of cup 29 with a cut-off corner as shown in FIGURE 11, so that the corresponding corner 35 of the other layer of pervious product projects from said cup and constitutes a tab easily gripped by the user to facilitate the separation.

In the alternate form of embodiment illustrated in FIGURES 13 to 15 of the drawings, a tear-off line 36 of considerably reduced thickness between the upper portion of the upper cavity 29b of cup 29 and its edge; thus, by pulling one of the corners of the cup edges as well as the upper layer 34 of plastic material, this top layer may be torn off to permit the access to the medicinal product 33.

In the modified form of embodiment shown in FIGURE 16, six similar packings 37 are formed in a sheet, each containing a medicinal product and being connected to the adjacent packing by a pair of very narrow lugs 38 whereby the different packings can be separated from one another, and the user may take the requisite number of medicinal products without spoiling the remaining ones.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claim.

What I claim is:

A package of medicinal products comprising a dehydrating device in combination with the medicinal products, said dehydrating device consisting of a layer of impervious material, comprising in its central portion a cavity, a dehydrating product disposed in said central cavity, a layer of material pervious to water vapor, which covers the free face of said dehydrating product and is sealed along its edges to those of the layer of impervious material, and a rib overlying said cavity, said rib being so arranged that said layer of pervious material may penetrate beneath said rib and be automatically locked in position thereby, said package further comprising an extension of said cavity, a medicinal product for example in the form of a tablet, disposed in said extension above said layer of pervious material, and another layer of impervious material for closing the assembly.

References Cited

UNITED STATES PATENTS

| | | | |
|---|---|---|---|
| 1,844,189 | 2/1932 | Stuart | 206—42 X |
| 2,008,659 | 7/1935 | Salfisberg | 206—56 X |
| 2,589,735 | 3/1952 | Salfisberg | 206—56 X |
| 2,695,207 | 11/1954 | Windsor | 312—31 |
| 3,084,984 | 4/1963 | Adler | 99—171 X |

DAVID J. WILLIAMOWSKY, Primary Examiner.

J. L. KOHNEN, Assistant Examiner.